Figure 3:
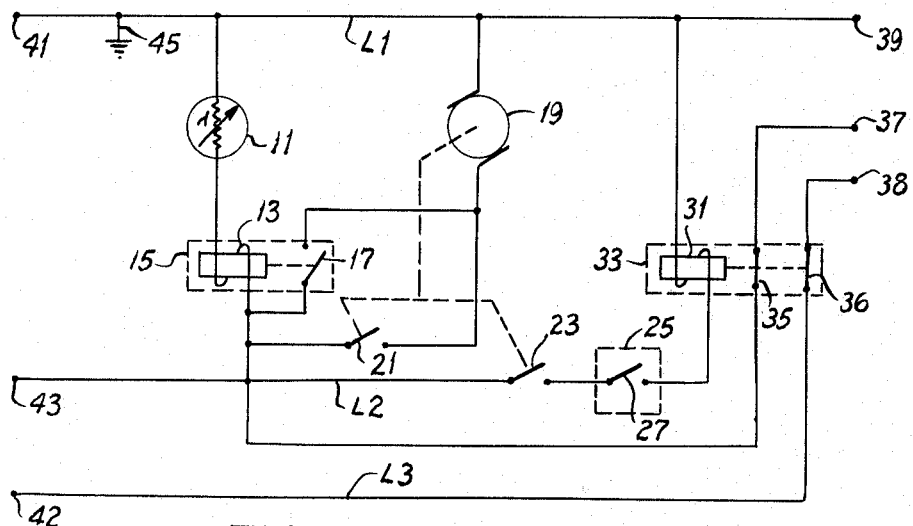

July 19, 1966  R. L. COE  3,261,992
ELECTRICAL LOAD BALANCING CONTROL SYSTEM
Filed Oct. 21, 1965  3 Sheets-Sheet 1
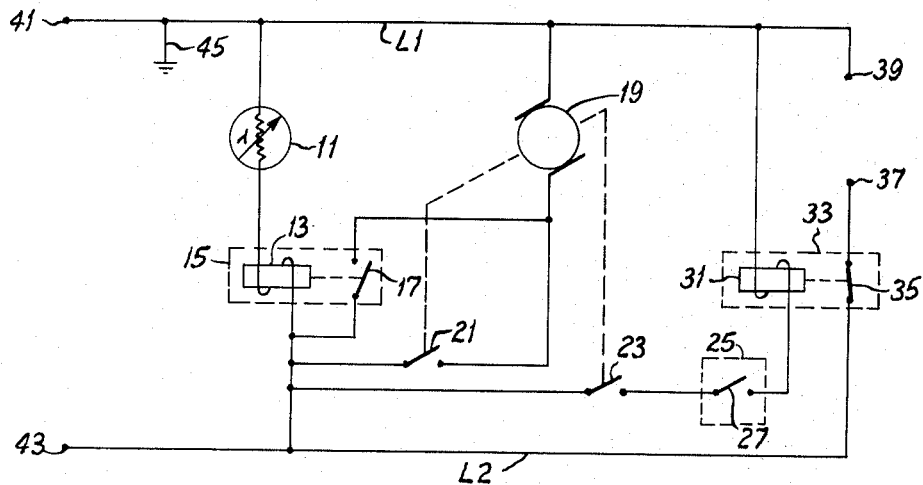
FIG.I.
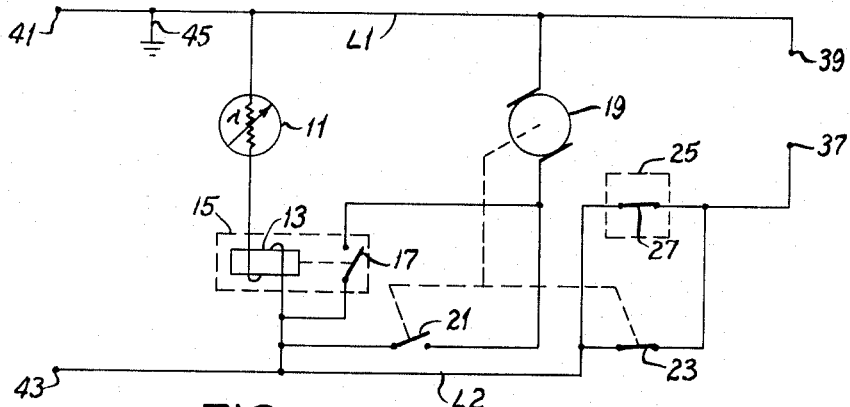
FIG.2.
Robert L. Coe,
Inventor..
Koenig, Pope, Senniger and Powers,
Attorneys.

July 19, 1966  R. L. COE  3,261,992
ELECTRICAL LOAD BALANCING CONTROL SYSTEM
Filed Oct. 21, 1965  3 Sheets-Sheet 3

United States Patent Office
3,261,992
Patented July 19, 1966

3,261,992
ELECTRICAL LOAD BALANCING CONTROL SYSTEM
Robert L. Coe, 48 Arundel, Clayton, Mo.
Filed Oct. 21, 1965, Ser. No. 507,602
27 Claims. (Cl. 307—117)

This application is a continuation-in-part of my copending patent application Serial No. 218,999, filed August 23, 1962, and now abandoned, for Electrical Load Balancing Control System.

This invention relates to an electrical load balancing control system, and more particularly to apparatus for use in electrical distribution systems for reducing the load on these systems during periods of expected maximum demand.

Nearly all electric utility companies face a serious problem which threatens to jeopardize their competitive positions as suppliers of energy, particularly to residential consumers. This problem stems from the need for these utilities to provide and maintain generating facilities and distribution networks which are ample by a safe margin to meet the demand for electric power during periods of peak or maximum demand that occur infrequently throughout the year. In a particular area or community, for example, these periods of peak or maximum demand occur only during certain months of the year, and during these months, only under particular conditions. The level of electrical power consumed during other than these peak periods in most communities is considerably less than the peak demand, and accordingly a substantial percentage of the generating facilities and distribution networks of a utility company, representing a considerable capital investment, remains idle a good portion of the time. This substantially increases the overall operating costs of a utility which in turn increases the cost of electricity to the consumers. It has been estimated, for example, that for every kilowatt of peak load over average load, a utility must invest several hundred dollars in extra capacity. The present invention is directed to a system which provides a solution to this problem by reducing the peak load in a particular area or community during periods of expected maximum demand.

Among the several objects of this invention may be noted the provision of apparatus for use in electrical distribution systems for reducing the load on these systems during periods of expected maximum demand; the provision of a load balancing system in which various criteria are employed to predict these periods of maximum demand with a high degree of accuracy; the provision of an electrical load balancing system which reduces the capital investment of the utilities and substantially lessens the cost of electricity to consumers without impairing service to these consumers; the provision of such a load balancing system which does not require periodic resetting or otherwise demand regular maintenance; and the provision of a load balancing system which is relatively inexpensive, rugged, and reliable in operation. Other objects and features will be in part apparent and in part pointed out hereinafter.

In its broader aspects, the invention relates to an electrical load balancing control for use in electrical distribution systems for selectively disconnecting an electrical load device, for example, a consumer's air conditioning compressor or electric water heater, from the distribution system during periods of expected maximum demand on this system. Periods of maximum demand in any particular area or community follow rather closely a particular pattern. A major midwestern utility has found, for example, that in each of the last ten years their peak annual load occurred during one of the summer months from June 15 to September 15, on a weekday at approximately 3:00 p.m. when the outside or atmospheric temperature was above 95° F. This utility would be classified as a "summer daytime peak company." Other utility companies, experience their peak loads during the winter months, in the evening hours generally, and only when the temperature outside is below a certain level. These companies are referred to as "winter evening peak companies." In every case, the occurrence of peak demand in any particular area depends generally upon two conditions; first, the time of day, or more particularly, the time after sunrise or after sunset as the case may be; and secondly, and perhaps most important, the atmospheric temperature. Because of the increasing use of air conditioning and electric heating equipment, this latter feature, atmospheric or outside temperature, promises to play an ever-increasing role in determining the load and demand characteristics of a particular utility. The present invention employs both time and temperature considerations concurrently to predict periods of maximum demand on a system, and, as noted above, reduces this maximum demand by reducing the load during these periods.

Briefly, the control system of this invention comprises circuit means including first and second switches each having first and second positions for connecting an electrical load device to an electrical power source when either of these switches is in its respective second position, and a sequence timer including an electrical motor electrically connected to the power source for actuating the first switch to its first position for a predetermined time period during each of a plurality of sequential 24-hour periods. Also included in the system is temperature-sensing means responsive to atmospheric temperature for actuating this second switch to its first position when tht atmospheric temperature reaches a preselected temperature level. Thus, the system disconnects the electrical load device from the distribution system during periods when both of the switches are in their respective first positions. When the control system is properly programmed, these periods correspond to periods of maximum demand on the distribution system.

The invention accordingly comprises the systems hereinafter described, the scope of the invention being indicated in the following claims.

In the accompanying drawings, FIGS. 1–7 are schematic diagrams illustrating seven of various possible embodiments of this invention.

Corresponding reference characters indicate corresponding parts throughout the drawings.

Referring now to the drawings, and more particularly to FIG. 1, a first embodiment of this invention is illustrated as including a light-sensing means 11, for example, a cadmium sulfide photocell, connected in series with a coil 13 of a relay 15 between a pair of conductors or lines L1 and L2. Included in relay 15 is a switch 17 actuated by coil 13. This switch is connected in series with a motor 19 and is adapted when closed to connect this motor across lines L1 and L2. Motor 19 constitutes the driving motor of a sequence timer which also includes a pair of switches 21 and 23. Switch 21 is connected in parallel with switch 17 and when closed completes a holding circuit for motor 19. Switch is connected between line L2 and a temperature-sensing device indicated at 25. Switches 21 and 23 are individually actuated by motor 19, preferably through a rotating shaft and a set of cams. This type of control is conventional and accordingly, not specifically illustrated in FIG. 1. Temperature-sensing device 25 includes temperature-responsive means, for example a bimetallic element, which actuates a switch 27 in response to ambient temperature. Connected between switch 27 and line L1 is a coil 31 of a contactor or relay 33. This coil 31 controls the position of a switch 35 connected between line L2 and an output terminal 37. A second output terminal is indicated at 39, and a pair of input terminals for the network, at 41 and 43. Line L1 is connected to ground as indicated at 45 and constitutes a common ground for the system.

The apparatus of FIG. 1 when employed in association with the electrical services to individual consumer loads on an electrical generating and distribution system, and when properly programmed, functions to accurately predict periods of maximum load on this system and selectively disconnect one or more classes of electrical load devices from the system during these periods. Stated somewhat differently, the apparatus of FIG. 1 maintains service to these load devices at all times except during these periods of expected maximum demand. When employed in residential use, a consumer's water heater might constitute the load device to be disconnected, in which case the heating element of this water heater would be connected across terminals 37, 39. Terminals 41, 43 would then be connected to the distribution system, preferably at the consumer's service entrance.

Operation of the FIG. 1 system, assuming it is to balance the residential load for a "summer daytime peak" company, is as follows: Terminals 41 and 43 are connected to the neutral and one of the other of the three-wire feeder lines which supply service to the residence, with terminal 41 being connected to the neutral or grounded line. Photocell 11 is located on the outside of the residence in a translucent housing, for example, so that it is responsive to sunlight or solar illumination level. The electrical resistance of this photocell varies in response to this illumination from several megohms in total darkness to a few hundred ohms under conditions of high illumination. A daily cycle of operation of the timing portions of the FIG. 1 circuit is initiated at sunrise when the solar illumination impinging on photocell 11 reaches a predetermined level, causing its resistance to drop, thereby causing the current through relay coil 13 to be sufficient to actuate the contacts of switch 17 to a closed position. This connects motor 19 between lines L1 and L2, energizing this motor. Upon energization, motor 19 closes switch 21 which completes a holding circuit for the motor. After a first preselected time delay, motor 19 actuates switch 23 to its closed position and holds it there for a second preselected time interval. At the end of this second preselected time interval switch 23 is reopened. Switch 17 remains closed until sunset, at which time the illumination impinging upon photocell 11 rapidly decreases, causing the resistance of this photocell to increase until the current through coil 13 is insufficient to hold switch 17 in its closed position. Switch 17 is then actuated to its open condition. Motor 19, however, remains energized through switch 21 and the cycle continues until motor 19, after say eighteen hours of operation, actuates switch 21 to its open position. The timer is set up to open switch 21 after a period less than twenty-four hours after the initiation of a cycle of operation so that the duration of a daily cycle is always less than twenty-four hours. The opening of switch 21 deenergizes motor 19 and resets the circuit for a subsequent cycle of operation to be initiated at sunrise when the solar illumination reaching photocell 11 again causes the closing of switch 17 which in turn energizes motor 19.

The first preselected time interval between the energizing of motor 19 and the closing of switch 23, and the second predetermined time interval between the closing of switch 23 and its reopening are each dependent upon the history of occurrences of peak loads for the particular utility company in question. If peak loads occurred in the past only between the hours of 2:30 p.m. and 3:30 p.m., for example, the timer may be programmed to close switch 23 at 1:30 p.m. and reopen it at 4:30 p.m. to bracket the expected periods of peak demand. If sunrise occurs at approximately 5:00 a.m. each day during the summer, the timer should then be set or programmed to close switch 23 eight and one-half hours after sunrise and reopen it again eleven and one-half hours after sunrise.

Temperature-sensing device 25 is also located on the outside of the residence, preferably in the same housing with photocell 11, where it is able to respond to outside or atmospheric temperature. Device 25 functions to close switch 27 whenever the atmospheric temperature goes above a preselected temperature level and to open this switch whenever the atmospheric temperature is below this level. Again the setting or programming of this device will depend upon the history of occurrences of peak loads for the particular utility involved. If these periods occurred in the past only when the atmospheric temperature was above 95° F., for example, device 25 should be set or calibrated to close switch 27 only when the outside temperature reaches this 95° level. The closing of both switches 23 and 27 completes a circuit from line L1, through coil 31, to line L2, energizing this coil and causing switch 35, which is normally closed, to open. This in turn disconnects the electrical load device connected between terminals 37 and 39.

An important feature of this invention is that the disconnection of a consumer's load device occurs only when both time and temperature conditions predict a period of maximum demand. If the atmospheric temperature rises above the 95° level at times other than the 1:30 p.m. to 4:30 p.m. period, for example, even though switch 27 closes, switch 23 remains open, preventing the energizing of coil 31, thereby maintaining service to the load device. On the other hand, the daily closing of switch 23 from 1:30 p.m. to 4:30 p.m. does not cause coil 31 to be energized unless temperature-responsive switch 27 is also closed. Periods of peak demand on the distribution system are thus predicted with a high degree of accuracy. This avoids needless disconnection of a consumer's load device at times, or under temperature conditions, when there is little or no possibility of a peak load. Moreover, because the timer employed is reset each morning, it cannot get off-time because of power outages or the like, and accordingly, the unit of FIG. 1 does not require costly periodic checking or resetting.

An additional advantage of the FIG. 1 system is that since the timers in any particular area are unlikely to be exactly synchronized, employing these systems inherently provides for a staggering of the reapplication of the load devices to the distribution systems after a period of predicted peak demand. This lessens considerably the chance of an overload which might occur if all of the disconnected load devices were reconnected at the same time.

It has been estimated that if a system such as illustrated in FIG. 1 were employed at each residence in a particular area to selectively disconnect only the water heater and air conditioning loads in this area, the cost of supplying electricity to the area would be reduced as much as 30%. These estimates take into account the initial expense of providing and installing the FIG. 1 systems. In a particular area, the concurrence of time and temperature conditions predicting a period of maximum demand are likely to occur only a few times a year, and accordingly, a consumer's load equipment, for example, his hot water heater and central air conditioning compressor would only be disconnected for a few brief periods during the year, causing little, if any, inconvenience. Studies have indicated, for example, that because of the thermal inertia of a typical insulated house, the disconnection of the central air conditioning compressor for a period of four hours, even at midday, would cause the temperature in the house to rise only a few degrees. This would be hardly noticeable, particularly if the blower portion of the air conditioning system were, as preferred, caused to run during periods of disconnection of the compressor.

It is preferred, if the history of occurrences of peak loads indicate that such occurrences are unlikely to occur on the weekend because of the random activity of the community on weekends, that the timer be programmed to skip Saturday and Sunday, i.e., to close switch 23 during five daily cycles corresponding to the weekdays and then leave it open during the subsequent two daily cycles. Such a "skip-a-day" feature could be accomplished, as is known to those skilled in the art, by an override cam which would prevent the closing of switch 23 during two of seven daily cycles. This feature, along with the necessity of concurrence of both critical time and temperature conditions before disabling or disconnecting the power to the selected load device, would provide further insurance against the needless disconnecting of the consumer's load device when there is no possibility of a peak load.

While the operation of the FIG. 1 load balancing system has been outline with reference to a so-called "summer daytime peak" company, it is to be understood that the system might just as readily be employed to balance the load in an area in which peak loads are experienced in the winter months, during certain hours in the evening and only when the temperature drops below a certain temperature level. In balancing the load in a "winter evening peak" area, the timer portion of the apparatus would be programmed to close switch 23 during the critical evening hours, and temperature-sensing means 25 would be set to close switch 27 only when the temperature drops below the critical temperature level. Motor 19, in such a case, could either be energized at sunrise to close switch 23 in the evening, or preferably, relay 15 could be set up with switch 17 normally closed instead of normally open to energize this motor at sunset; i.e., switch 17 could be caused to close, energizing motor 19, when the rising impedance of photocell 11 causes relay 15 to be deenergized. Again, both time and temperature conditions pointing to a period of maximum demand must occur simultaneously in order for the consumer's load device to be disconnected. It has been estimated that the use of the FIG. 1 apparatus in a "winter evening peak" area to selectively disconnect water heater and space heating loads would reduce the cost of supplying electricity to this area almost 25%. Again, because of the thermal inertia of a typical insulated house, disconnection of the space heating equipment for a brief period, even during the coldest evening, would not be expected to lower the inside temperature more than a few degrees.

A second embodiment of this invention is illustrated in FIG. 2. This embodiment employs most of the components illustrated in FIG. 1, and like elements are indicated by corresponding reference numerals. In FIG. 2, instead of connecting switches 23 and 27 in series and employing a contactor such as contactor 33 to selectively disconnect a load device, switches 23 and 27 are connected in parallel to directly connect and disconnect the load device. Also, switches 23 and 27 are normally closed to normally connect terminal 37 to line L2 and thus normally maintain service to one or more selected load devices connected across terminals 37, 39. In operation, terminal 37 is disconnected from line L2 only when both of switches 23 and 27 are actuated to their respective open positions. This occurs only when both time and temperature conditions are within the range that would usually exist only during any period of maximum demand.

Inherent in the FIG. 2 embodiment are all of the advantages of the FIG. 1 system outlined above. This system may be employed to balance the load in either "summer daytime peak" areas or "winter evening peak" areas. Again needless disconnections of a consumer's load device are avoided, along with the requirement for periodic checking or resetting of the timing portion of the system. It will be understood that if desired, a contactor such as contactor 33 of FIG. 1 (but having a normally open switch) could be employed in the FIG. 2 system, the coil of which would be connected between terminals 37 and 39. It will also be understood that the timing portion of the FIG. 2 system might incorporate the "skip-a-day" feature described above. The estimates of cost reduction given above are of course applicable to the FIG. 2 system.

A third embodiment of this invention, to be employed when the load to be disconnected is a 240 volt load such as a 240 volt water heater, air conditioning, or space heating load, is illustrated in FIG. 3. This embodiment is identical to the embodiment illustrated in FIG. 1 with the exception that contactor 33 includes an additional set of contacts, i.e., switch 36, which connects a third output terminal 38 to an additional line L3. An additional input terminal for the network is indicated at 42. In use, the three input terminals 41, 42 and 43 are connected to the feeder lines of a consumer's single-phase three-wire 120 v./240 v. service, with terminal 41 connected to the neutral or grounded line, terminal 42 connected to one of the hot lines, and terminal 43 connected to the other hot line. The load device to be disconnected is then connected at output terminals 37–39. The operation of the FIG. 3 system is the same as that outlined above in connection with FIG. 1, i.e., when and only when both time and temperature conditions coincide to predict a period of maximum load, switches 35 and 36 open, disconnecting the 240 volt load, thereby reducing the load on the distribution system.

Figure 4:
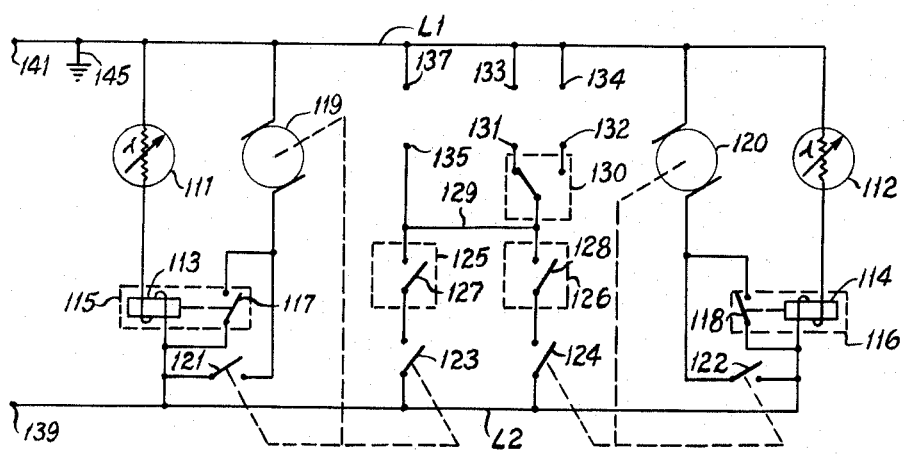

A fourth embodiment of this invention is illustrated in FIG. 4. In some areas, the load characteristics are such that the peak load on one portion of a generating and distribution system occurs in the summer months, while the peak load on the remaining portions of the system occur during the winter months. In a particular area, for example, the peak loads on the transmission portion of a system (i.e., that portion of the system from the generating facilities to and including the bulk substations) might be a summer daytime peak load, whereas the load on the distribution portion of the system (i.e., that portion from the bulk substations to the consumers' services including the distribution substations) might, because of electric space heating equipment, be a winter evening peak load. The FIG. 4 load balancing system is designed for use in three areas by a summer daytime peak company that wishes to control water heater and air conditioning loads during summer daytime peaks, and water heater and electric heating equipment loads during winter evening peaks.

Referring now to FIG. 4, this fourth embodiment is illustrated as including a pair of light-sensing means 111 and 112, each connected in series with respective coils 113 and 114 of a pair of relays 115 and 116. Relay 115 includes a switch 117 connected in series with a motor 119 and is adapted to connect this motor across lines L1 and L2. Similarly, relay 116 includes a switch 118 connected in series with a motor 120 and is adapted to connect this motor across lines L1 and L2. Motor 119 constitutes the driving motor of a sequence timer which also includes a pair of switches 121 and 123. Switch 121 is connected in parallel with switch 117 and, when closed, completes a holding circuit for motor 119. Switch 123 is connected between line L2 and a switch 127 of a temperature-sensing device indicated at 125. Motor 120 constitutes the driving motor of a similar sequence timer which includes a pair of switches 122 and 124. Switch 122 is connected in shunt with switch 118 to form a holding circuit for motor 120. Switch 124 is connected between line L2 and a temperature-sensing means 126 which includes a switch 128. A conductor 129 is provided to connect one side of switch 127 to a terminal of switch 128. A double-throw thermostatic or temperature-responsive switch 130, having a pair of output terminals 131 and 132, is connected to conductor 129. An opposed pair of output terminals on line L2 are indicated at 133 and 134. An additional pair of output terminals are indicated at 135 and 137, and a pair of input terminals for the network, at 139 and 141. Line L1 is connected to ground as indicated at 145 and constitutes a common ground for the system.

Photocells 111 and 112 are each located on the outside of the residence, along with temperature-responsive means 125, 126 and 130, and the 120 volt feeder lines are connected to input terminals 139 and 141. Three contactors (such as illustrated at 33 in FIG. 1) are employed with the FIG. 4 system; one to control the consumer's hot water heater, a second to control his air conditioning compressor, and a third to control his space heating equipment. Each of these contactors has a coil adapted when energized to disconnect the respective load device from the distribution system. The coil of the hot water heater contactor is connected between 135 and 137; the coil of the air conditioning contactor is connected between terminals 131 and 133; and the coil of the heating equipment contactor is connected between terminals 132 and 134. Thermostatic switch 130 determines whether the FIG. 4 system responds to predicted summer daytime loads or winter evening loads. This switch connects terminal 131 to conductor 129 in the summer when the outside temperature is above say 70° F. and connects coil 132 to this conductor in the winter when the outside temperature is below this 70° level.

A daily cycle of operation of the FIG. 4 system, assuming summer operation, is initiated when the solar illumination impinging upon photocell 111 causes timer motor 119 to be energized. Upon energization of motor 119, switch 121 is closed forming a holding circuit for this motor. Switch 123 is controlled by motor 119 to close during tthe critical periods in the afternoon, say 1:30 p.m. to 4:30 p.m., when summer daytime peak loads are possible. Temperature-sensing device 125 is set or adjusted to close switch 127 when the outside temperature also indicates that summer daytime peak loads are possible. Since temperature-responsive switch 130 connects terminal 131 to conductor 129 during the summer months, the simultaneous closing of switches 123 and 127 energizes the coils of both the hot water heater contactor and the air conditioning contactor, disconnecting both of these load devices from the distribution system. As was the case with the FIGS. 1–3 systems, this happens only when time and temperature conditions indicate the likelihood of a period of peak demand. After closing and reopening switch 123, motor 119 continues to run until, some time after sunset, say eighteen hours after it has been energized, when it opens switch 121. At this point, the circuit is reset for a subsequent cycle.

A daily cycle of operation of the FIG. 4 system, assuming winter operation, is initiated when photocell 112 and relay 116 energize motor 120 at sunset. Upon energization, motor 120 closes switch 122 completing a holding circuit. Switch 124 is controlled by motor 120 to close during the critical periods in the evening say 6:00 p.m. to 8:00 p.m., when winter evening peak loads might be expected. Temperature-sensing device 126 is adjusted to close switch 128 whenever the outside temperature drops below a preselected level, for example 20° F. As temperature-responsive switch 130 connects terminal 132 to conductor 129 during the winter months, the simultaneous closing of switches 124 and 128 energizes the coils of both the hot water heater contactor and the electric heating equipment contactor, disconnecting both of these load devices from the distribution system. Again, this happens only when time and temperature conditions indicate the likelihood of a period of peak demand. After closing and reopening switch 124, motor 120 continues to run until some time after sunrise when it opens switch 122. At this point, the circuit is reset for a subsequent cycle.

It will be understood that both the summer and winter timing portions of the FIG. 4 system might incorporate the "skip-a-day" feature to inhibit the closing of switches 123 and 124 on weekends, if the history of occurrences of peak demand indicate that peak loads are unlikely on the weekend. It will also be understood in connection with FIG. 4 that instead of two separate timers energized by two individual photocells, one timer energized by a single photocell and having an extra set of contacts could be employed as the obvious equivalent to close switches 123 and 124 at the appropriate times. Also, instead of three temperature-sensing devices, a multiple-stage thermostat, for example of the mercury switch type, could be employed to actuate the various switches under the appropriate temperature conditions.

It has been estimated that employing a system such as illustrated in FIG. 4 at each residence in an area in which most homes are electrically heated, will reduce the cost of supplying electricity to this area as much as 45%. Again, this estimate takes into account the expense of initial installation and any maintenance of the FIG. 4 systems.

In order to avoid the possibility of a transient flash of light, for example, the light from a passing auto, initiating a cycle of operation in the systems of FIGS. 1–4, the sequence timers of each of these systems could be set so as to close the holding-circuit switch (switch 21 in FIGS. 1–3, switch 121 in FIG. 4) only after a predetermined delay, for example 15 minutes after the energization of the sequence timer. Also, while the motor of each of the various sequence timers is illustrated as being energized by a solenoid type relay it is to be understood that other arrangements might be employed. For example, a heating element might be connected in series with the light-responsive photocell, and a temperature-responsive switch positioned adjacent this heating element might be employed to energize a timer motor. Moreover, while electric water heater, air conditioning and space heating equipment have been set forth as examples of the consumer load devices which are disconnected during periods of expected maximum demand, it is to be understood that other electrical load equipment may be selected for disconnection during these periods.

In each of the embodiments, the components employed other than the photocells and the temperature-responsive devices may either be located outside of the utility customer's building and in the same housing with the photocells and temperature-responsive devices, or these components may be located within the utility customer's building either at the central panelboard or adjacent the load device which is to be controlled.

Figure 5:
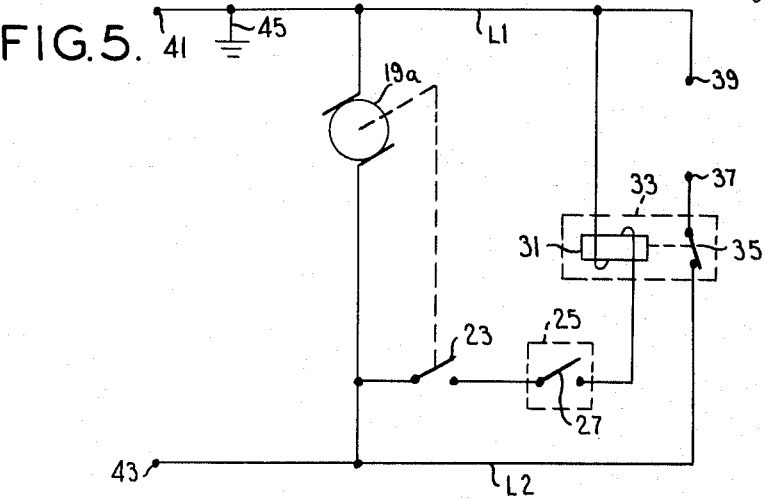

The embodiment illustrated in FIG. 5 is similar to that of FIG. 1 except that a continuously operating synchronous timer motor 19a is employed, and the light-sensing means 11 and relay 15 are omitted. These latter components, which constitute means for maintaining the time in substantial diurnal synchronism, are not essential in areas where there are no significant power discontinuances.

Figure 6:
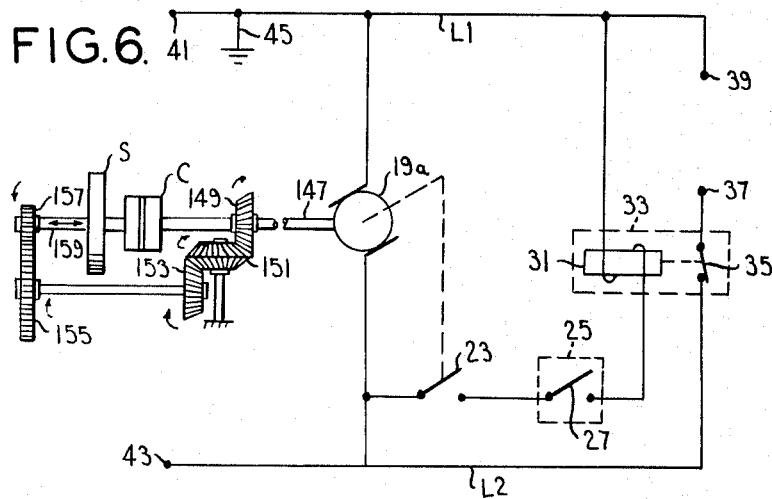

The FIG. 6 embodiment is identical to that of FIG. 5 except that a timer synchronizing means is utilized which differs somewhat in construction but is equivalent in function to the light-sensing means 11 and relay 15 of FIGS. 1–3. In this embodiment a shaft 147 is provided for the timer. This shaft is normally driven by motor 19a and, by means of a train of gears 149, 153, 155 and 157, will maintain a frictionally restrained clock spring and timing escapement unit S in a wound condition. A clutch C is interposed between a shaft 159 and shaft 147. This clutch is of any of several conventional types, e.g., friction or magnetic, which will remain disengaged as long as electrical power is supplied thereto, but upon electrical deenergization will actuate to couple the two shafts 159 and 147. Shaft 159 is axially movable as indicated and when clutch C is actuated upon power failure, shaft 159 moves to disengage shaft 159 and gear 157 and thus permit spring and escapement unit S to drive deenergized timer motor 19a through clutch C and continue to maintain the timer synchronized. Upon restoration of electric power clutch C will be reopened and shaft 159 and gear 157 will be reengaged so that unit S will be rewound and thus readied for any subsequent power outage. In all other respects the control system of FIG. 6 operates in the same manner as described above in regard to the other previous embodiments.

Figure 7:
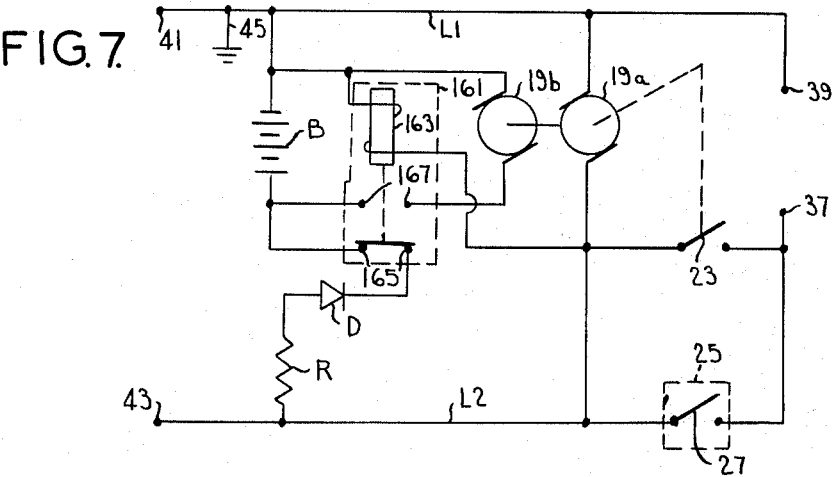

Referring now to FIG. 7, the control system embodiment illustrated is similar to that of FIG. 2 except that a continuously operating synchronous motor 19a is employed and a different means is employed for maintaining the timer in substantial diurnal synchronism. Rather than utilizing the light-sensing means 11 and relay 15, a D.C. motor 19b, a relay 161, and a battery B are employed to continue to synchronously drive motor 19a in the event of a power outage. Motor 19b is mechanically connected to the shaft of motor 19a. Relay 161 has its coil 163 connected across power source L1, L2 and will maintain closed (through a set of contacts 165) a circuit including a resistor R and a diode D, which constitute a charging circuit for battery B. Any power outage will deenergize both motor 19a and relay 161 which then (by means of a second set of contacts 167) will connect battery B to energize motor 19b and thus continue to maintain the timer operating substantially synchronously during the duration of the power outage. The FIG. 7 control operates otherwise as described above with regard to the other embodiments. Thus, for example, the load device connected across terminals 37 and 39 will continue to be connected across the A.C. power source when either of the switches 23 or 27 is in its respective second position (open in FIGS. 1, 3, 5 and 6 and closed in FIGS. 2 and 7), but during any period when both of the switches 23 and 27 are in their respective first positions (closed in FIGS. 1, 3, 5 and 6 and open in FIGS. 2 and 7) the load device is disconnected from the power sournce.

It will be noted that in the embodiments of FIGS. 1–4 the time period during which switch 23 (or 123 or 124) is in its first position may be made long enough to cover the known incermental variations in the times of sunrise or sunset. These variations are relatively small during periods of expected demand, i.e., midsummer and midwinter. However, if it is desired to eliminate even this variation, timer 19 may include a compensator cam which corrects for such incremental variations. Such timers are known to those skilled in this art.

In view of the above, it will be seen that the several objects of the invention are achieved and other advantageous results attained.

As various changes could be made in the above systems without departing from the scope of the invention, it is intended that all matter contained in the above description and shown in the accompanying drawings be interpreted as illustrative and not in a limiting sense.

What is claimed is:

1. A control system for selectively disconnecting an electrical load device from a source of electrical power, said control system comprising circuit means including first and second switches each having first and second positions for connecting said load device to said source when either of said switches is in its respective second position, a sequence timer including an electrical motor electrically connected to said power source for actuating said first switch to its first position for a predetermined time period during each of a plurality of sequential 24-hour intervals, and atmospheric temperature sensing means responsive to atmospheric temperatures for actuating said second switch to its first position when said atmospheric temperature reaches a preselected temperature level, whereby said load device is disconnected from said source during periods when both of said switches are in their respective first positions.

2. A control system as set forth in claim 1 in which said sequence timer includes a cam which is driven by the motor, and which is shaped to actuate said first switch to its first position for a predetermined daily time period.

3. A control system as set forth in claim 1 which further includes means for maintaining said timer in substantial diurnal synchronism.

4. A control system as set forth in claim 3 in which said means for maintaining said timer in substantial diurnal synchronism comprises a D.C. motor adapted to drive said sequence timer, a battery, and switch means for automatically energizing said D.C. motor upon and during any periods of deenergization of said source of electrical power.

5. A control system as set forth in claim 4 which further includes means for maintaining said battery charged while said electrical power source energizes said electrical timer motor.

6. A control system for selectively disconnecting an electrical load device from a source of electrical power, said control system comprising light-sensing means positioned to respond to solar illumination, a first switch having first and second positions, a sequence timer responsive to said light-sensing means for actuating said first switch to its first position a predetermined time interval after said solar illumination reaches a preselected level, a second switch having first and second positions, temperature-sensing means responsive to atmospheric temperature for actuating said second switch to its first position when said atmospheric temperature reaches a preselected temperature level, and means including said first and second switches interconnecting said source and said load device whereby said load device is disconnected from said source during periods when both of said switches are in their respective first positions.

7. A control system as set forth in claim 6 wherein said means interconnecting said source and said load device includes a relay adapted when energized to disconnect said load device from said source.

8. A control system as set forth in claim 7 wherein said first and second switches are connected in series, and wherein said switches energize said relay to disconnect said load device when they are both in their respective closed positions.

9. A control system as set forth in claim 6 wherein said first and second switches are connected in parallel, and wherein said load device is disconnected from said source when both of said switches are in their respective open positions.

10. A control system as set forth in claim 9 wherein said means interconnecting said source and said load device includes a relay adapted when deenergized to disconnect said load device from said source, and wherein said relay is deenergized when both of said switches are in their respective open positions.

11. A control system as set forth in claim 6 wherein said light-sensing means comprises a photocell having an electrical resistance which varies as a function of the solar illumination impinging thereon, said photocell being interconnected with switch means which energize said timer when the resistance of said photocell reaches a preselected level.

12. A control system as set forth in claim 6 wherein said light-sensing means is responsive to said solar illumination rising above a preselected level thereby to cause said sequence timer to actuate said first switch to its first position a predetermined time interval after said solar illumination rises above said preselected level.

13. A control system as set forth in claim 12 wherein said temperature-sensing means is responsive to said atmospheric temperature rising above a preselected temperature level to actuate said second switch to its first position when said atmospheric temperature rises above said preselected temperature level.

14. A control system as set forth in claim 6 wherein said light-sensing means is responsive to said solar illumination dropping below a preselected level, thereby to cause said sequence timer to actuate said first switch to its first position a predetermined time interval after said solar illumination drops below said preselected level, and wherein said temperature-sensing means is responsive to said atmospheric temperature dropping below a preselected temperature level to actuate said second switch to its first position when said atmospheric temperature drops below said preselected temperature level.

15. A control system as set forth in claim 6 wherein said load device is an electric hot water heater.

16. An electrical load balancing control system for use in an electrical distribtuion system for selectively disconnecting electrical load equipment from said distribution system during periods of expected maximum demand, said control system comprising a light-sensing photocell positioned to respond to solar illumination, switch means responsive to said photocell for energizing a sequence timer when said solar illumination reaches a preselected level, a first switch having first and second positions, said first switch being actuated to its first position by said sequence timer a first predetermined time interval after the energizing of said timer and to its second position a second predetermined time interval, greater than said first predetermined time interval, after the energizing of said timer, a second switch having first and second positions, temperature-responsive means responsive to atmospheric temperature for actuating said second switch to its first position when said atmospheric temperature reaches a preselected temperature level, and means including said first and second switches connecting said load equipment to said distribution system whereby said load equipment is disconnected therefrom during periods when both of said switches are in their respective first positions, said periods of disconnection corresponding to periods of expected maximum demand on said distribution system.

17. An electrical load balancing control system as set forth in claim 16 wherein said means connecting said load equipment to said distribution system includes a relay adapted when energized to disconnect said load equipment from said distribution system, and wherein said first and second switches are connected in series, said switches energizing said relay when they are both in their respective closed positions.

18. An electrical load balancing control system as set forth in claim 16 wherein said first and second switches are connected in parallel, and wherein said load equipment is disconnected from said distribution system when both of said switches are in their respective open positions.

19. An electrical load balancing control system as set forth in claim 16 wherein said light-sensing means is a cadmium sulfide photocell having an electrical resistance which varies as a function of the solar illumination impinging thereon, said switch means including a relay having a coil connected in series with said photocell whereby the current through said coil varies with the resistance of said photocell, said switch means energizing said timer when the current through said coil reaches a preselected level.

20. An electrical load balancing control system as set forth in claim 16 wherein said light-sensing photocell is responsive to said solar illumination dropping below a preselected level to actuate said switch means to energize said sequence timer when said solar illumination drops below said preselected level, and wherein said temperature-responsive means is responsive to said atmospheric temperatures dropping below a preselected temperature level to actuate said second switch to its first position when said atmospheric temperature drops below said preselected temperature level.

21. An electrical load balancing control system as set forth in claim 20 wherein said electrical load equipment includes an electric hot water heater and electric space heating equipment.

22. An electrical load balancing control system as set forth in claim 16 wherein said light-sensing photocell is responsive to said solar illumination rising above a preselected level to actuate said switch means to energize said sequence timer when said solar illumination rises above said preselected level, and wherein said temperature-responsive means is responsive to said atmospheric temperature rising above a preselected temperature level to actuate said second switch to its first position when said atmospheric temperature rises above said preselected temperature level.

23. An electrical load balancing control system as set forth in claim 22 wherein said electrical load equipment includes an electrical hot water heater and an air conditioning compressor.

24. A control system for selectively disconnecting first, second and third electrical load devices from an electrical distribution system, said control system comprising first light-sensing means positioned to respond to solar illumination, a first switch having first and second positions, a first sequence timer responsive to said first light-sensing means for actuating said first switch to its first position a predetermined time interval after said solar illumination rises above a preselected level, a second switch having first and second positions, first temperature-sensing means responsive to atmospheric temperature for actuating said second switch to its first position when said atmospheric temperature rises above a preselected temperature level, second light-sensing means positioned to respond to solar illumination, a third switch having first and second positions, a second sequence timer responsive to said second light-sensing means for actuating said third switch to its first position a predetermined time interval after said solar illumination drops below a preselected level, a fourth switch having first and second positions, second temperature-sensing means responsive to atmospheric temperature for actuating said fourth switch to its first position when said atmospheric temperature drops below a preselected temperature level, and means including said first, second, third and fourth switches connecting said load devices to said distribution system whereby said first load device and one of said second or third load devices are disconnected from the distribution system when either said first and second switches or said third and fourth switches are in their respective first positions.

25. A control system as set forth in claim 24 wherein said connecting means includes temperatures-responsive switch means for determining which of said second and third load devices is to be disconnected from the distribution system.

26. A control system as set forth in claim 25 wherein said first and second switches are connected in series, and said third and fourth switches are connected in series, and wherein the first position for each switch is its closed position.

27. A control system as set forth in claim 25 wherein said first load device is an electric water heater, said second load device is an air conditioning compressor, and said third load device is electric heating equipment.

No references cited.

ORIS L. RADER, *Primary Examiner.*

W. M. SHOOP, *Assistant Examiner.*